(12) United States Patent
Byrnes et al.

(10) Patent No.: US 11,461,643 B2
(45) Date of Patent: Oct. 4, 2022

(54) DEEP ADAPTIVE SEMANTIC LOGIC NETWORK

(71) Applicant: SRI International, Menlo Park, CA (US)

(72) Inventors: John Byrnes, Poway, CA (US); Richard Rohwer, San Diego, CA (US)

(73) Assignee: SRI International, Menlo Park, CA (US)

( * ) Notice: Subject to any disclaimer, the term of this patent is extended or adjusted under 35 U.S.C. 154(b) by 505 days.

(21) Appl. No.: 16/611,177

(22) PCT Filed: May 8, 2018

(86) PCT No.: PCT/US2018/031645
§ 371 (c)(1),
(2) Date: Nov. 5, 2019

(87) PCT Pub. No.: WO2018/208813
PCT Pub. Date: Nov. 15, 2018

(65) Prior Publication Data
US 2020/0193286 A1    Jun. 18, 2020

Related U.S. Application Data

(60) Provisional application No. 62/503,809, filed on May 9, 2017.

(51) Int. Cl.
*G06N 3/08*        (2006.01)
*G06F 16/242*      (2019.01)
(Continued)

(52) U.S. Cl.
CPC ........... *G06N 3/08* (2013.01); *G06F 16/2246* (2019.01); *G06F 16/243* (2019.01);
(Continued)

(58) Field of Classification Search
CPC ...... G06N 3/00; G06N 3/0427; G06N 3/0454; G06N 3/08; G06N 5/022; G06F 16/2246; G06F 16/243; G06F 15/00; G06Q 10/10
See application file for complete search history.

(56) References Cited

U.S. PATENT DOCUMENTS

| | | | |
|---|---|---|---|
| 6,094,646 A * | 7/2000 | Runkler | G06N 7/023 |
| | | | 706/52 |
| 7,689,526 B2 | 3/2010 | Byrnes et al. | |
| (Continued) | | | |

OTHER PUBLICATIONS

International Search Report and Written Opinion, PCT/US2018/031645, ISA:US, dated Aug. 7, 2018, 14 pages.
(Continued)

*Primary Examiner* — Etienne P Leroux
(74) *Attorney, Agent, or Firm* — Rutan and Tucker, LLP

(57) ABSTRACT

An artificial intelligence engine that has two or more modules cooperating with each other in order to create one or more machine learning models that use an adaptive semantic learning for knowledge representations and reasoning. The modules cause encoding the representations and reasoning from one or more sources in a particular field with terminology used by one or more human sources in that field into a set of rules that act as constraints and that are graphed into a neural network understandable by a first machine learning model, and then ii) adapting an interpretation of that set of encoded rules. The understanding of that set of encoded rules is adapted by i) allowing for semantically similar terms and ii) by conclusions derived from training data, to create an understanding of that set of encoded rules utilized by the machine learning model and the AI engine.

20 Claims, 11 Drawing Sheets

(51) Int. Cl.
G06F 16/22 (2019.01)
G06N 3/04 (2006.01)
G06Q 10/10 (2012.01)
(52) U.S. Cl.
CPC ......... *G06N 3/0427* (2013.01); *G06N 3/0454* (2013.01); *G06Q 10/10* (2013.01)

(56) References Cited

U.S. PATENT DOCUMENTS

| | | | |
|---|---|---|---|
| 8,788,701 | B1 | 7/2014 | Byrnes et al. |
| 2014/0201126 | A1 | 7/2014 | Zadeh et al. |
| 2015/0286969 | A1 | 10/2015 | Warner et al. |
| 2016/0026919 | A1* | 1/2016 | Kaisser .................. G06Q 50/01 706/12 |
| 2016/0179945 | A1 | 6/2016 | Lastra Diaz et al. |
| 2017/0039486 | A1 | 2/2017 | Simard et al. |

OTHER PUBLICATIONS

C. M. Bishop. Pattern Recognition and Machine Learning. 2006, 758 pages, Springer, New York.
Buchanan, B. et al. Denral and Meta-Dendral: Their Applications Dimension. Artificial Intelligence, 1978, 20 pages.
Byrnes, J. et al. Text Modeling for Real-Time Document Categorization. IEEE Aerospace Conference, 2005, 11 pages, Big Sky.
Fabre, C. et al. Distributional Semantics Today Introduction to the Special Issue. Traitement Automatique des Langues (Hermes Science Publications), 2015, 15 pages, Semantique distributionnelle.
Freitag, D. et al. New Experiments in Distributional Representations of Synonymy. Ninth Conference on Computational Natural Language Learning (CoNLL), 2005, 8 pages, Ann Arbor.
Graves, A. et al. Neural Turing Machines. arxiv.org/abs/1410.5401, 2014, 26 pages.
Graves, A. et al. Hybrid Computing Using A Neural Network With Dynamic External Memory. Nature, 2016, 21 pages.
Kanerva, P. The Spatter Code for Encoding Concepts at Many Levels. ICANN94, 1994, 4 pages.
Kanerva, P. Hyperdimensional Computing: An Introduction to Computing in Distributed Representation with High-Dimensional Random Vectors. Cognitive Computation 1, 2009, 21 pages.
Paradis, R. et al. Finding Semantic Equivalence of Text Using Random Index Vectors. Proceedings of the Complex Adaptive Systems, 2013, 6 pages.
Kanerva, P. What We Mean When We Say "What's the Dollar of Mexico?": Prototypes and Mapping in Concept Space. Quantum Informatics for Cognitive, Social, and Semantic Processes, AAAI Fall Symposium, Arlington, Virginia, 2010, 5 pages.
Krizhevsky, A. et al. ImageNet Classification with Deep Convolutional Neural Networks. Advances in Neural Information Processing Systems, 2012, 9 pages.
Landauer, T. K. et al. A Solution to Plato's Problem: The Latent Semantic Analysis Theory of Acquisition, Induction, and Representation of Knowledge. Psychological Review, 1997, 30 pages.
Lou, C. et al. Ribozyme-based insulator parts buffer synthetic circuits from genetic context. Nature Biotechnology, 2012, 13 pages.
Mikolov, T. et al. Linguistic Regularities in Continuous Space Word Representations. NAACL-HLT 2013, 2013, 6 pages.
Molyneux, S. Meta + The Chan Zuckerberg Initiative: Unlocking Scientific Knowledge. https://www.facebook.com/notes/sam-molyneux/meta-the-chan-zuckerberg-initiativeunlocking-scientific-knowledge/1429809013718811. Retrieved Feb. 3, 2017, 4 pages.
NECPC and SRI International Jointly Develop Artificial Intelligence for Machine Learning of Web Content. http://nec-lavie.jp/common/release/en/1701/2601.html. Retrieved Feb. 3, 2017, 3 pages.
Plate, T. A common framework for distributed representation schemes for compositional structure. Connectionist Systems for Knowledge Representation and Deduction, 1997, 20 pages.
Plate, T. Estimating analogical similarity by dot-products of Holographic Reduced Representations. NIPS, 1993, 8 pages.
Pollack, J. B. Recursive Distributed Representations. Artificial Intelligence, 1990, 32 pages.
Richardson, M. et al. Markov Logic Networks. Machine Learning, 2006, 44 pages.
Rohwer, R. A representation of representation applied to a discussion of variable binding. Neurodynamics and Psychology, 1994, 10 pages.
Rohwer, R. et al. Coarse Lexical Translation with no use of Prior Language Knowledge. Proc. Workshop on Building and Using Comparable Corpora, Language Resources and Evaluation Conference (LREC), 2008, 6 pages, Marrakech, Morocco.
Rohwer, R. The 'Moving Targets' Training Algorithm. Advances in Neural Information Processing Systems 2, 1990, 8 pages.
Rumelhart, D. E. et al. Parallel Distributed Processing: Explorations in the Microstructure of Cognition. MIT Press, 1986, 544 pages.
Schmidhuber, J. Deep Learning in Neural Networks: An Overview. Tech Report IDSIA 03014, arXiv:1404.7828 v4, 2014, 75 pages.
Shaohuai, S. et al. Benchmarking State-of-the-Art Deep Learning Software Tools. arXiv:1608.07249v6, 2017, 6 pages.
Socher, S. et al. Parsing Natural Scenes and Natural Language with Recursive Neural Networks. Proceedings of the 28th International conference on Machine Learning, 2011, 8 pages.
Weiss, W. et al. Fundamentals of Model Theory. University of Toronto, 2015, 64 pages.
First-order Logic. Wikipedia, The Free Encyclopedia, https://en.wikipedia.org/w/index.php?title=First-order_logic&oldid=763770663. Accessed Feb. 5, 2017. 26 pages.
Xiong, C. et al. Dynamic Memory Networks for Visual and Textual Question Answering. arXiv:1603.01417v1, 2016, 10 pages.
Zhu, H. et al. Bayesian Invariant Measurements of Generalisation. Neural Processing Letters, 1995, 5 pages.
Zhu, H. et al. Bayesian Regression Filters and the Issue of Priors. J. Neural Computing and Applications, 1996, 20 pages.
Zhu, H. et al. Measurements of Generalisation Based on Information Geometry. Mathematics of Neural Networks: Models, Algorithms, and Applications, 1997, 7 pages.
Zhu, H. et al. No Free Lunch for Cross Validation. Neural Computation, 1996, 4 pages.

* cited by examiner

Rules encoded from the knowledge supplied by an expert $(\forall x,y)(friends(x,y) \rightarrow friends(y,x))$ $(\forall x,y)((smokes(x) \land friends(x,y)) \rightarrow smokes(y))$  302

$(\forall x)(smokes(x) \rightarrow hasCancer(x))$

Predicates/functions parsed out from the knowledge supplied by an expert                    predicates

| Person | Smokes | Cancer |
|--------|--------|--------|
| Bob    | Yes    | ?      |
| Peter  | ?      | Yes    |
| Huey   | ?      | No     |

304

| Person1 | Person2 | Friends |
|---------|---------|---------|
| Bob     | Peter   | Yes     |
| Huey    | Loui    | Yes     |

Figure 3

1. Map each person to a parameterized vector  400
   Bob • • • • •    Peter • • • •    Huey • • • •    Loui • • • •
2. Map each predicate/function to a parameterized network
   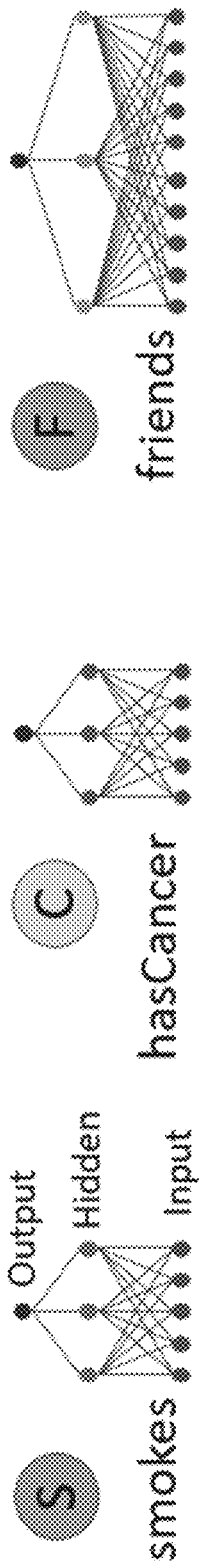
   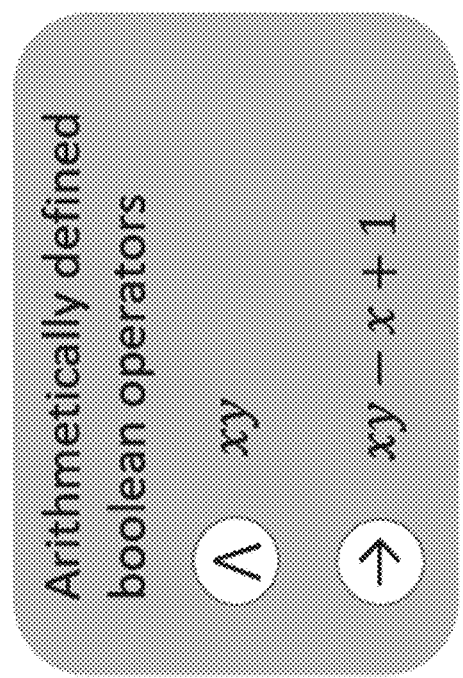
   smokes   hasCancer   friends
3. Construct full network from formula parse tree
   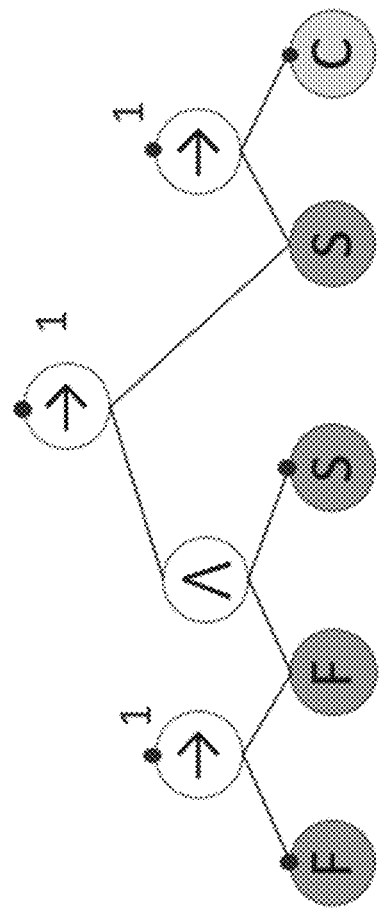
   Arithmetically defined boolean operators
   $\vee \quad xy$
   $\rightarrow \quad xy - x + 1$
   Figure 4

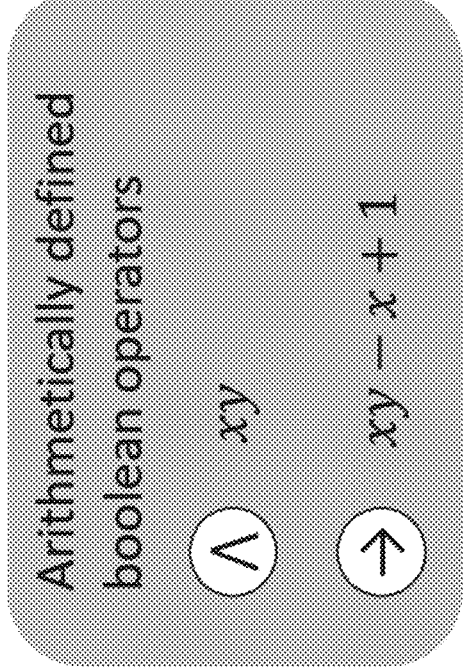
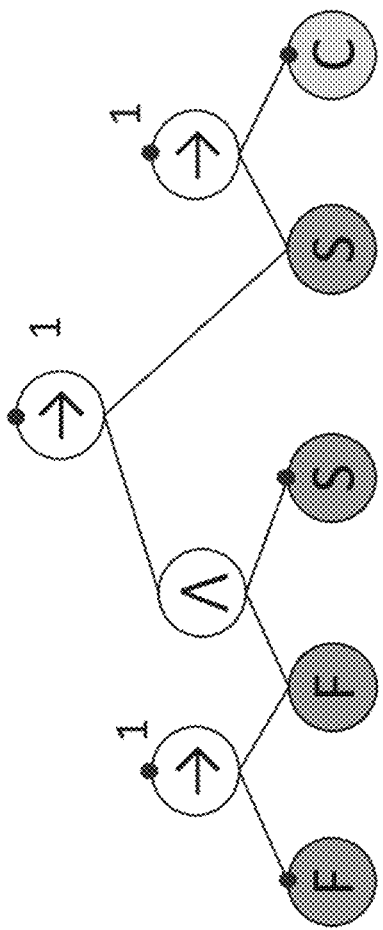
Figure 6

DEEP ADAPTIVE SEMANTIC LOGIC NETWORK

CROSS-REFERENCE

This application is a 35 U.S.C. § 371 U.S. National Stage of International Patent Application No. PCT/US2018/031645, titled "DEEP ADAPTIVE SEMANTIC LOGIC NETWORK" having an International Filing Date of May 8, 2018 which claims priority under 35 USC 119 to U.S. provisional patent application Ser. 62/503,809, titled "Deep adaptive semantic logic network," filed 9 May 2017, which the disclosure of such is incorporated herein by reference in its entirety.

TECHNICAL FIELD

Embodiments of this disclosure relate generally to artificial intelligence engines using deep adaptive semantic logic network devices, systems, and methods.

BACKGROUND

There are generally two kinds of artificial intelligence applications available to users today: those based on knowledge, which are good at reasoning but are very narrow in scope, and those based on data, which are good at learning but need to be custom ☐designed for specific data sets and often require very large amounts of data in order to produce reasonable results. What is needed is artificial intelligence that can do both.

Some current machine reasoning techniques can impose stringent requirements on the precision and usage of terminology, requiring an explosion in the number of assertions and a never-ending effort to fill in the missing pieces for each next experiment. Other machine learning techniques on the other hand either ignore subject matter expertise altogether or else require labor-intensive encoding of small amounts of expertise into custom statistical models that do very little outside of a narrow scope.

Scientific knowledge and hypotheses sometimes can most easily be expressed in a declarative, logical form that is currently difficult to express within the machine learning architectures needed to process the large volumes of scientific data provided by many modern technologies. What is needed is a technology that addresses this problem by automatically generating a machine learning architecture from a logical specification.

SUMMARY

Provided herein are various methods, apparatuses, and systems for an artificial intelligence engine.

The artificial intelligence engine cooperates two or more modules with each other in order to create one or more machine learning models that use an adaptive semantic learning for knowledge representations and reasoning. The artificial intelligence engine cooperates the two or more modules to cause encoding the representations and reasoning from one or more sources in a particular field with terminology used by one or more human sources in that field into a set of rules that act as constraints and that are graphed into a network understandable by a first machine learning model. The modules are configured to interpret the set of encoded rules. The artificial intelligence engine also modifies the interpretation of the initial set of encoded rules by modifying vectors associated with different constants of the initial set of rules. The artificial intelligence engine adapts vectors associated with different constants of the set of rules and parameters of the network associated with different functions and predicates to get a more optimum interpretation that makes the rules as true as possible. In another embodiment, The artificial intelligence engine uses a set of rules that act as constraints and that are graphed into a network understandable by a first machine learning model and also uses statistically-driven conclusions derived from training data to adapt the vectors.

The interpretation of the encoded rules can change by training the network to adapt vectors associated with different constants of the set of rules and parameters of the network associated with different functions and predicates to get a more optimum interpretation that makes the rules as true as possible. The artificial intelligence engine adapts vector values associated with the constants as well as adapt parameters of the neural network with a goal to make assertions of the representations and reasoning true as well as to be consistent with the data used for training the first machine learning model, which is indicated by a confidence score to convey the more optimum interpretation. A higher confidence score conveys that the reasoning is true as well as consistent with the data used for training the first machine learning model.

The interpretation of the encoded rules representing the knowledge representations and reasoning can be utilized in a machine learning model. The artificial intelligence engine allows the machine learning model to be queried via a query support module to present how determinations are made by the neural network in the machine learning model to give explainability to query results.

These and many more embodiments are discussed.

DRAWINGS

FIG. 3 illustrates a diagram of an embodiment of example set of rules and predicates to be encoded by a theory module and parsed by a parser module;

Figure 5:
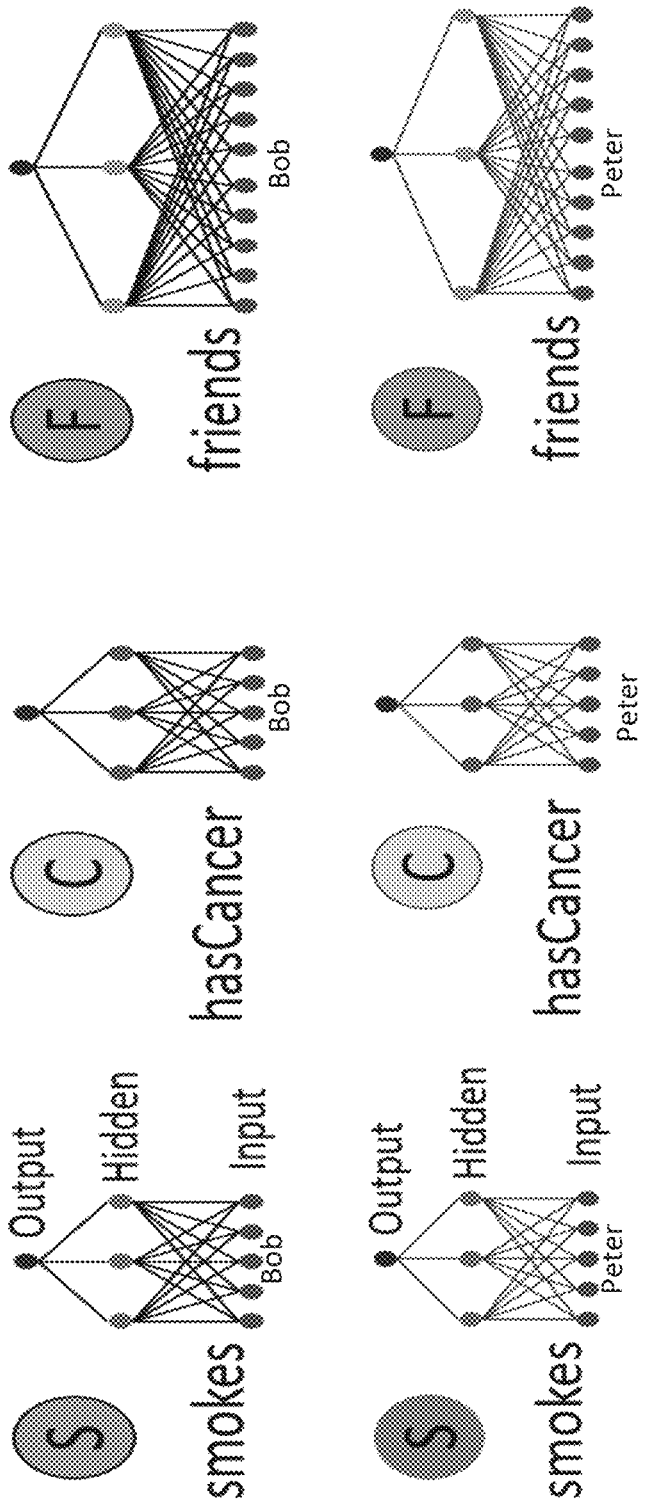
Figure 7:
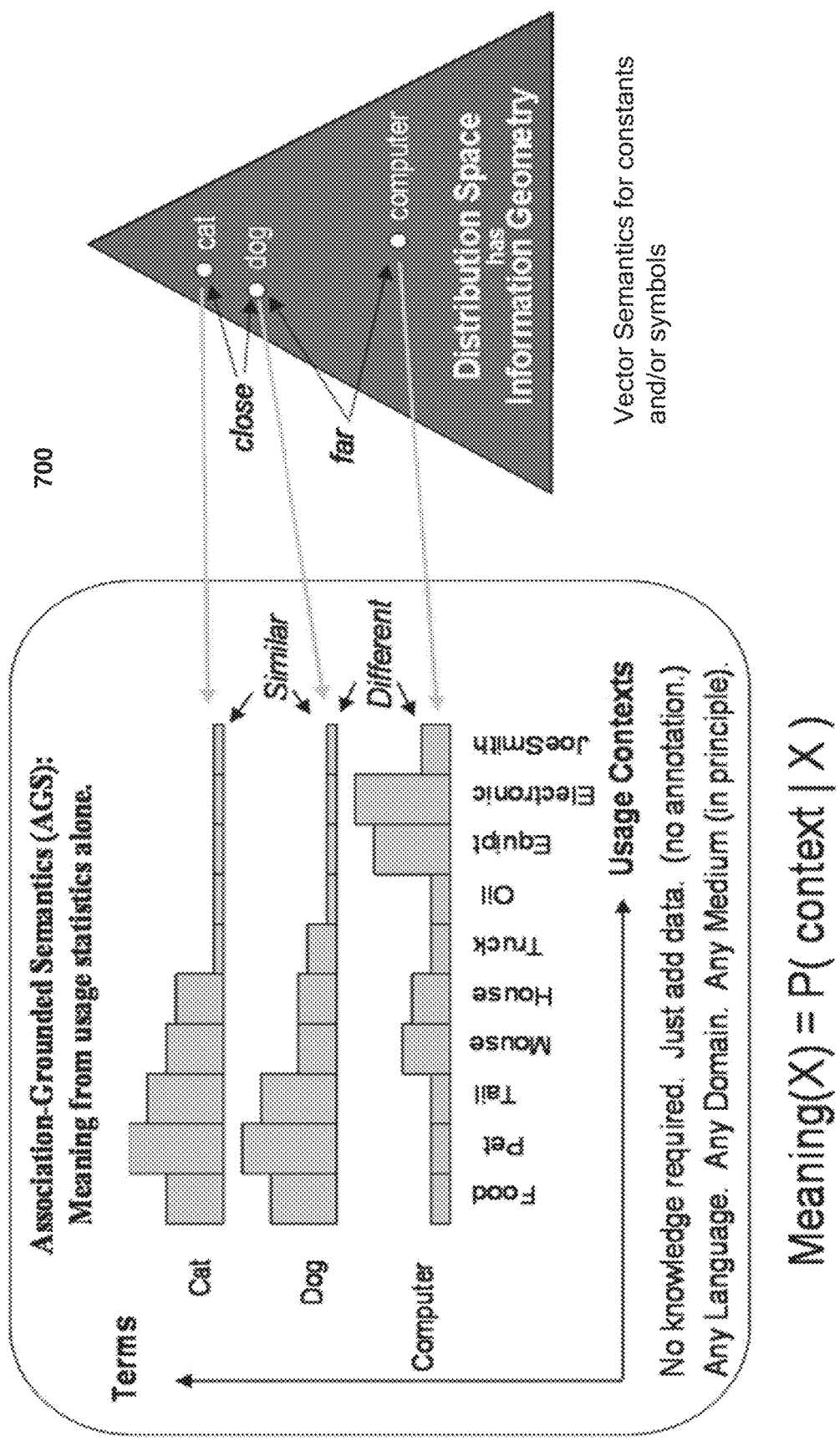
Figure 8:
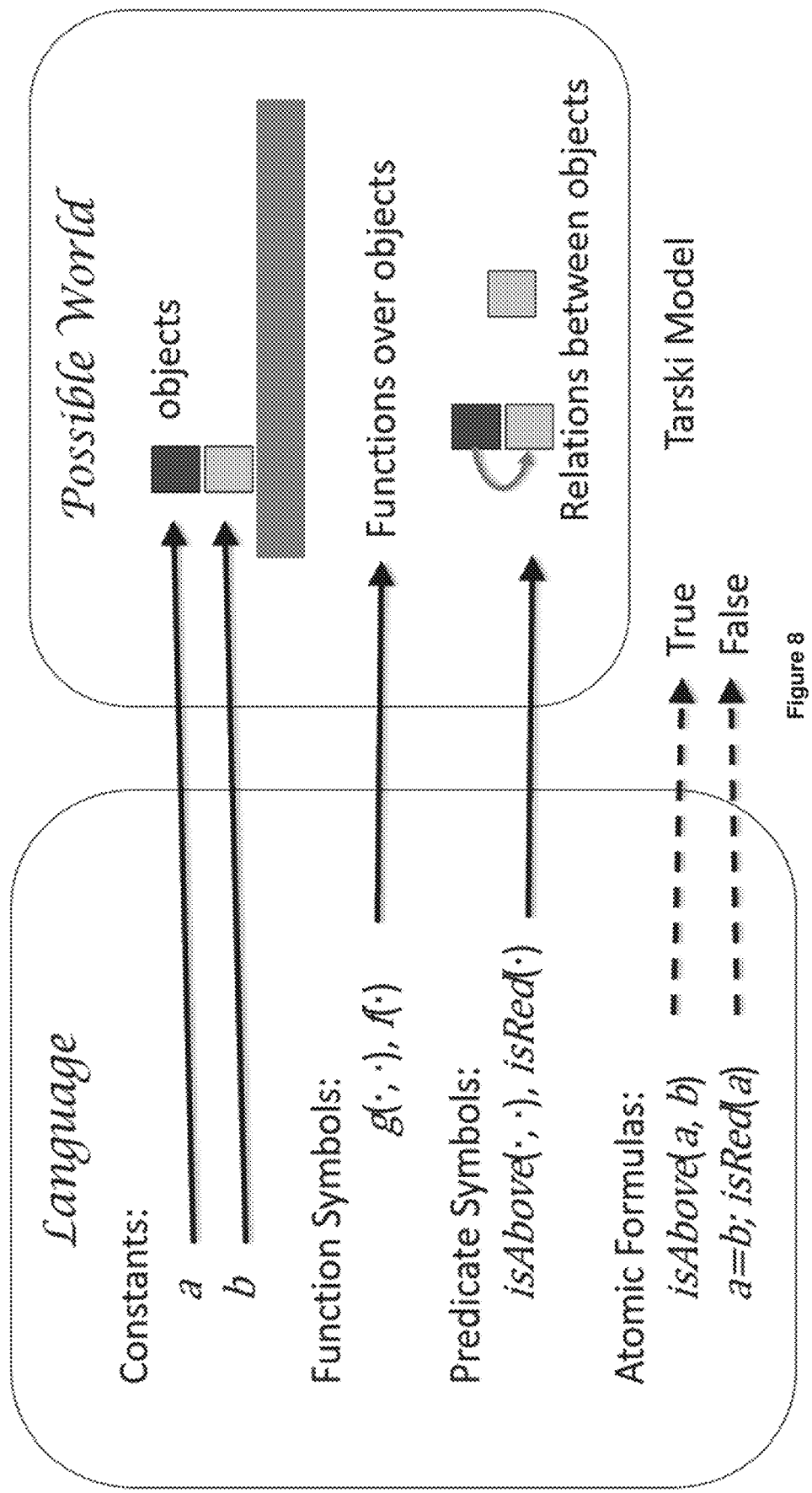
Figure 9:
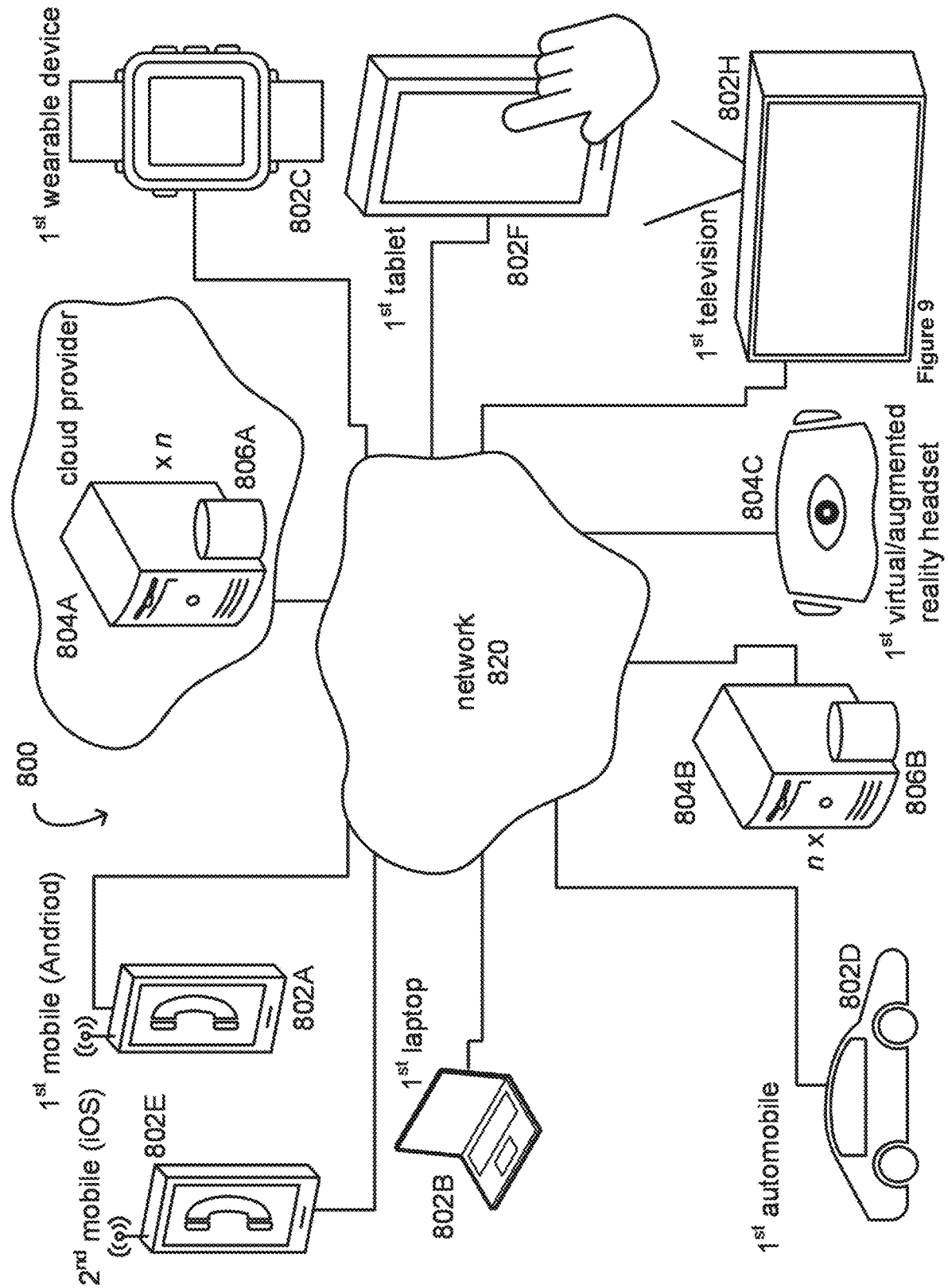
Figure 10:
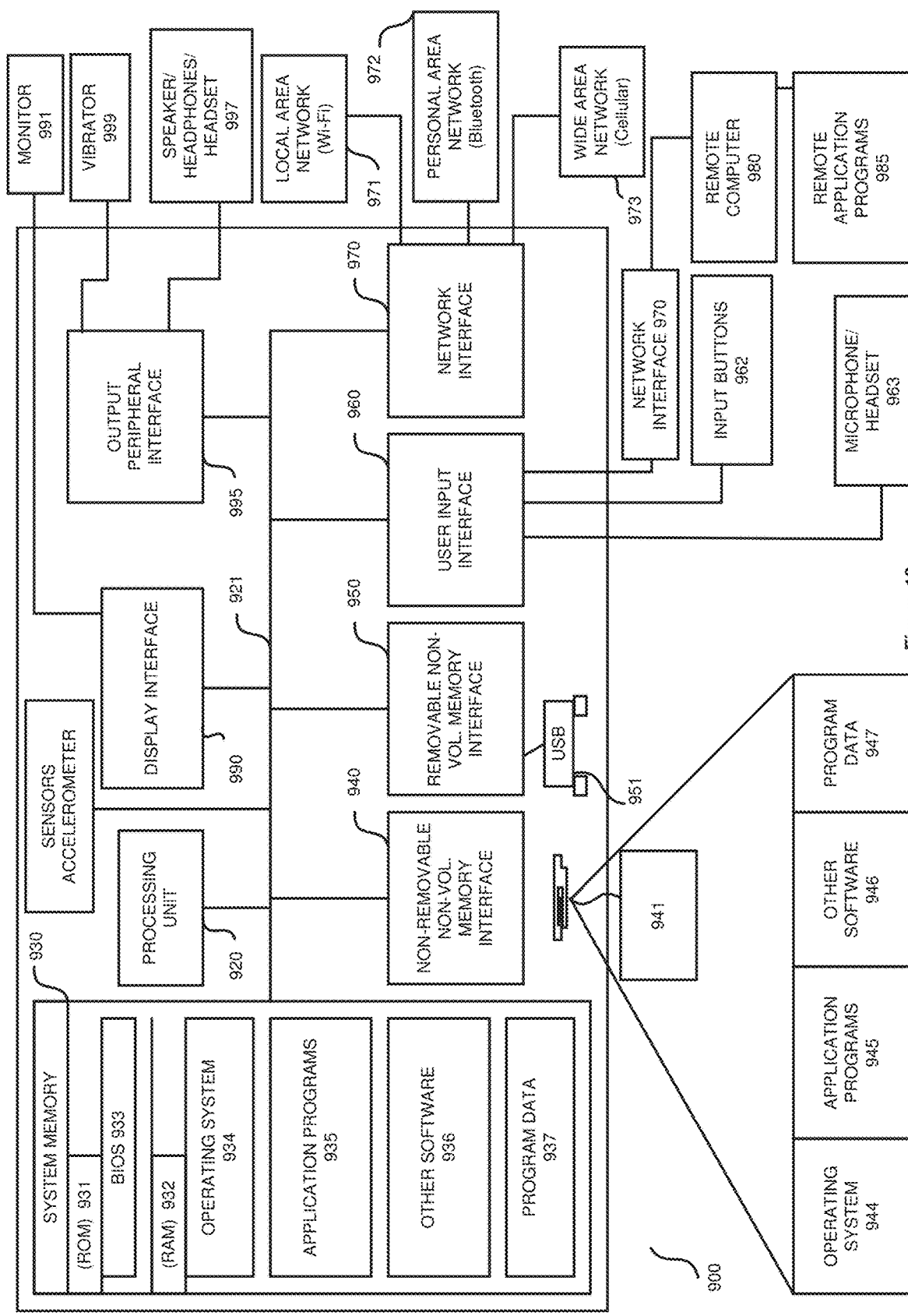
Figure 11:
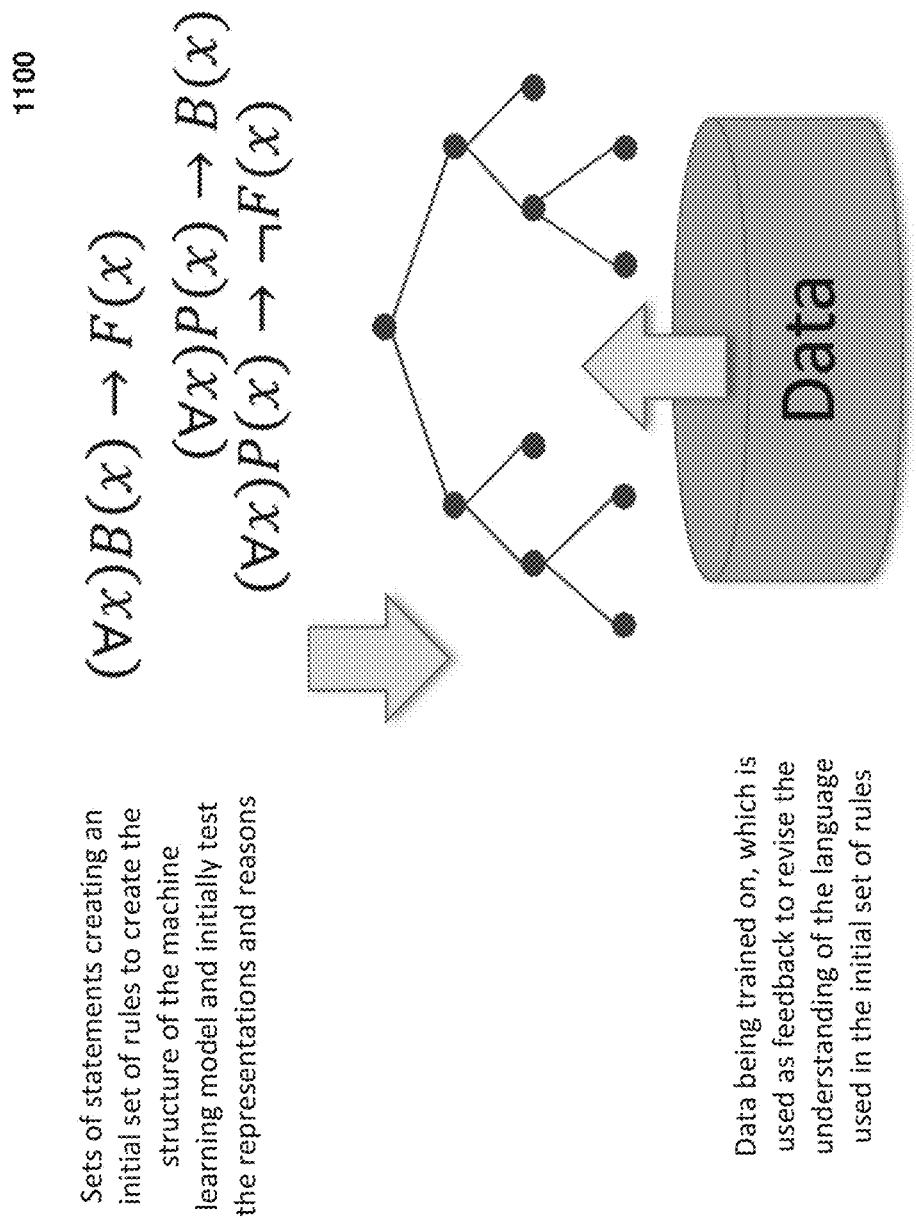

FIG. 4 illustrates a block diagram of an embodiment of module, such as a Tarski model, model representation module and/or the language module, configured to take in all of the constants in the statements and map them to semantic vector as inputs to the sub graph of the neural network, where the module is also configured to take in all of the predicates in the supplied statements and map them to a sub graph of the neural networks, and then construct a full network from the parse tree of that statement;

FIGS. 5 and 6 illustrate diagrams of an embodiment of a parser module configured to parse each statement to produce a parse stream into categories of constants, symbols, predicates and/or functions in that statement, where the parser module is also configured to cooperate with a directed acrylic graph of nodes module to go through each statement to turn each statement into its own tree structure of nodes and then layers of nodes for each predicate and/or function in that statement;

FIG. 7 illustrates a block diagram of an embodiment of one or more modules that are configured to modify an initial set of encoded rules by i) allowing for semantically similar terms of art found in the data used for training the machine learning models to be logically associated by the modules, ii) allowing for a list of semantically similar terms supplied by a user to be logically associated by the modules of the artificial intelligence engine, and iii) any combination of these two to be used by the modules to logically associate semantically similar terms of art;

FIG. 8 illustrates a block diagram of an embodiment of the language module configured to contain an inventory of all of the symbols, constants, functions, and predicates derived from a first statement by the expert and parsed out by the parser module;

FIG. 9 illustrates a diagram of a number of electronic systems and devices communicating with each other in a network environment in accordance with an embodiment of the artificial intelligence engine;

FIG. 10 illustrates a diagram of an embodiment of one or more computing devices that can be a part of the systems associated with the artificial intelligence engine and its associated models discussed herein; and FIG. 11 graphically illustrates a diagram of an embodiment of the concept of a deep adaptive semantic logic network being trained with both i) the knowledge assertions in the representations and reasoning provided from the expert knowledge through a theory module and ii) machine learning assertions derived from iterative training on data.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

Figure 1:
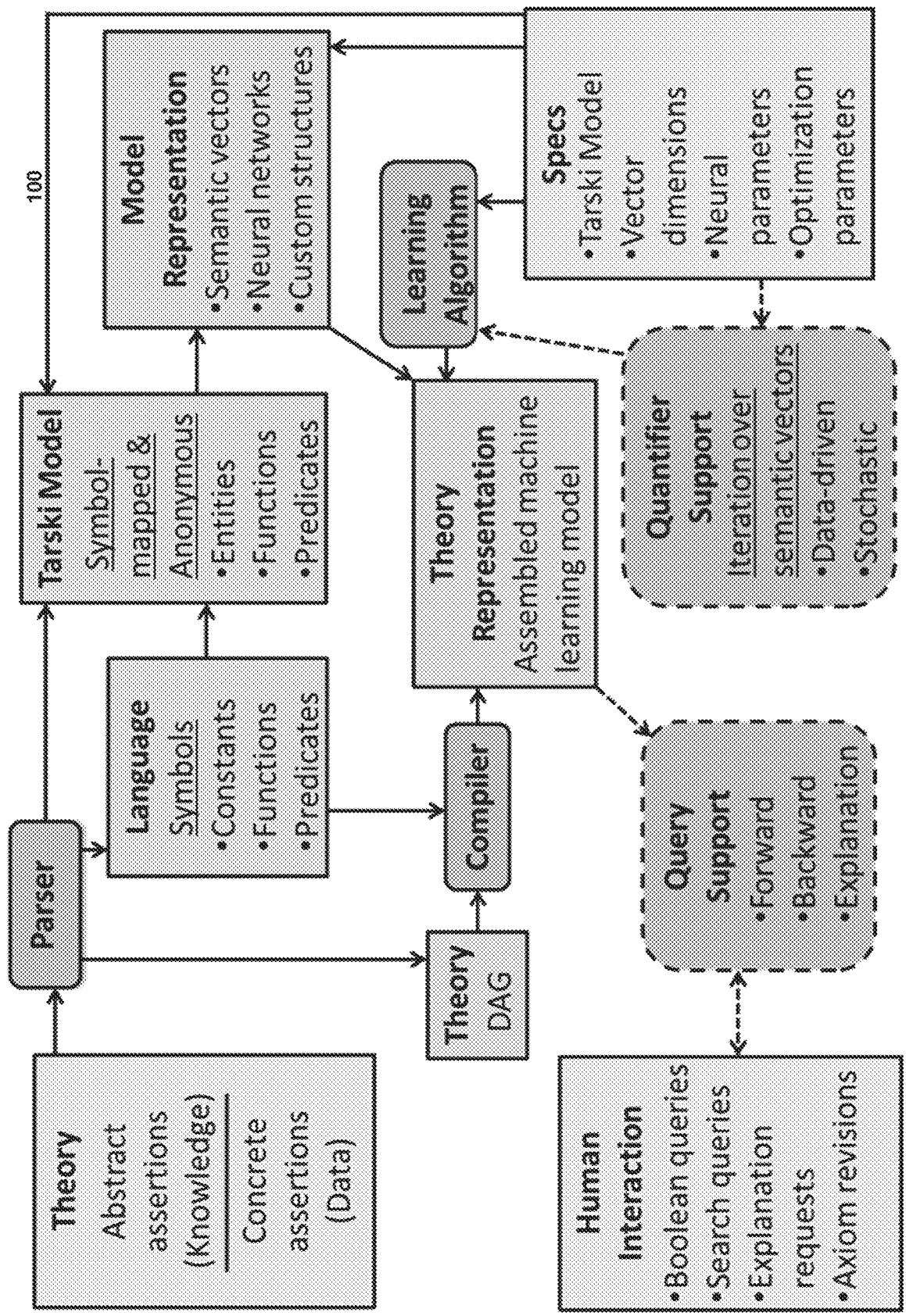
FIG. 1 illustrates a block diagram of an embodiment of an artificial intelligence engine containing two or more modules that are configured to cooperate with each other to create one or more machine learning models that use a deep adaptive semantic learning neural network for knowledge representations and reasoning.

FIG. 1 illustrates a block diagram of an embodiment of an artificial intelligence engine containing two or more modules that are configured to cooperate with each other to create one or more machine learning models that use a deep adaptive semantic learning neural network for knowledge representations and reasoning.

The artificial intelligence engine 100 contains two or more modules that are configured to cooperate with each other in order to create one or more machine learning models that use a deep adaptive semantic learning neural network for knowledge representations and reasoning. The two or more modules of the artificial intelligence engine 100 cooperate to encoding the representations and reasoning from one or more sources in a particular field with terminology used by one or more human sources in that field into a set of rules that act as constraints and that are graphed into a network understandable by a first machine learning model. The modules are configured to adapt the understanding of the set of encoded rules by i) allowing for semantically similar terms of art found in the data used for training the machine learning models to be logically associated by the modules, ii) allowing for a list of semantically similar terms supplied by an expert to be logically associated by the modules of the artificial intelligence engine, and iii) any combination of these two to be used by the modules to logically associate semantically similar terms of art. (See also FIG. 7.) The modules are also configured to adapt the understanding of the set of encoded rules by modifying vectors associated with different constants of the initial set of rules, for example, by using statistically-driven conclusions derived from training data. Note, all of the adaptions combine to create the understanding of the set of encoded rules representing the knowledge representations and reasoning utilized in a machine learning model that can be queried via a query support module.

The two or more modules may include a quantifier support module, a learning algorithm module that includes a database of learning algorithms, a language module, a parser module, a theory input module, a Tarski model, a model representation module, a directed acrylic graph of nodes module, a query support module, a theory representation module, and a specifications module. Note, the modules utilize one or more processors to execute any instructions coded in software and are stored in one or more memories of the artificial intelligence engine. Functions performed in one module may be replicated, combined, or ported to another module. The various modules may reference and otherwise communicate with each other.

The theory module may allow input of the humanly stated knowledge representations and reasoning, from one or more sources including an expert knowledge database and/or direct user input of discrete terms of art. The knowledge representations and reasoning can be introduced to label qualitative and quantitative elements of structures to provide a vocabulary that enables scientists to describe and understand a system associated with a machine learning model. The theory module may encode and send assertions and atomic formulae of predicates, functions and constants derived from the knowledge representations and reasoning to a language module via a parser module. Note, the constants may include, for example, entities, objects, names, people, things, etc.

The language module may use first order logic elements to make semi-formal scientific language comprehensible to computational algorithms by cooperating with the other modules to use machine learning to discover distributed vector representations of a meaning associated with the terminology in the representations and reasoning. The scientist can provide complex background knowledge and hypotheses in familiar (but formal) language in that particular field through the theory module. The AI engine 100 via the theory module can work with arbitrary formulas. Also, a human expert and/or existing databases can be the expert providing the knowledge base.

The theory module can be configured to allow assertions from the knowledge supplied by an expert to be encoded as the set of rules using the first order logic elements in the language module.

The theory module may be divided into abstract assertions with knowledge and concrete assertions with data. The assertions can go to logical constants as well as to atomic formulae. The knowledge from experts in that field/technology is inputted as a set of formal statements from theory input module. This inputted knowledge is used to create rules that act as constraints on the subsequent learning that occurs in the created machine learning model training on data. Thus, the theory of how things work is inputted by an expert in their language typical in that field/technology and encoded into a set of rules that can be operated on by a machine in a machine learning module. Advantageously, the AI engine 100 allows the user/expert to set the rules and dictate the constants, predicates/properties, via the knowledge representation and reasoning, which is encoded by the AI engine 100 into a formal language understandable by a computing device. However, even with this set of rules, there will still be room for interpretation of what the terminology means and how the rules apply. Note, the AI engine 100 employs the second part of machine learning with data training in order to adjust, in the set of rules, the understanding the of what the terms means and how the rules apply.

FIG. 11 graphically illustrates a diagram of an embodiment of the concept of a deep adaptive semantic logic network being trained with both i) the knowledge assertions in the representations and reasoning provided from the expert knowledge through a theory module and ii) machine learning assertions derived from iterative training on data. Sets of statement create a set of rules to create the structure of the machine learning model and initially test the representations and reasons. Subsequently, the data being trained on, is used as feedback to revise the understanding of the language/terminology used in the set of rules in order to create a current interpretation of the set of rules.

Referring back to FIG. 1, the theory module and a language module may cooperate to allow an expert to author a set of statements in a formal language based on the knowledge representations and reasoning using first order logic to create the set of rules. The set of rules is a set of statements encoded in the formal programming language. (For example, see the example rules graphically illustrated in the FIG. 3.)

A parser module may parse each statement to produce a parse stream into categories of constants, symbols, predicates, and/or functions in that statement. The parser module may cooperate with a directed acrylic graph of nodes module to go through each statement in order to turn each statement into its own tree structure of nodes and then layers of nodes for each predicate and/or function in that statement. (Graphically see the parsed example categories in FIG. 8 as well as in FIGS. 3, 4, and 5.)

The language module may also be configured to contain an inventory of all of the symbols, constants, functions, and predicates derived from the statements of the expert and parsed out by the parser module.

A Tarski Model or a multilayer perceptron (MLP) network can provide some intermediate organization around the parse tree and language.

A model representation module of the artificial intelligence engine 100 may construct a full neural network from all of the parse trees. The model representation module may assign learnable vector representations of meaning to the constants/entities in the ontology, and learnable models to its functions and predicates. The model representation module may adapt vector values associated with the constants as well as adapt parameters of the neural network with a goal to make assertions of the representations and reasoning true as well as to be consistent with the data used for training the machine learning model. The ontology may be a set of concepts and categories in a subject area or domain that shows their properties and the relations between them. The module representation may flush out the parameters that go into the machine learning model. The neural network will then learn the variables.

A theory representation module assembles all of this information and then creates the assembled machine learning model with a big neural network according to the set of rules. In the theory representation module, semantic reasoning may be performed directly in terms of these representations, and the representations will be learned to maximize agreement with the assertions supplied by knowledge base and by users.

Also, the model representation module may use multiple different variants of model representations versus using a single fixed model representation.

A specification module may include various Tarski models, factor dimensions, neural parameters, and optimization parameters. The specifications module may provide syntax for commonly used and default values, in which the user has an ability to override the default values. For example, the specifications for the vector dimensions maybe given. The neural parameters of how many layers and how many nodes can be set in the specifications module as well as optimization parameters with algorithms for cost functions, and which type of optimization should be used. The iterative training on the training data will to guide the statistically-driven conclusions derived from the training data. The specifications for the initial weights for the learning algorithm can be set in the specifications module. Various modules such as the model representation module may reference the specifications module.

A theory representation module may assemble neural networks and generate the machine learning model. The theory representation module of the artificial intelligence engine 100 is coded to automatically assemble the networks of graphs representing the representations and reasoning in the set of statements into the machine learning model. The theory representation module may learn parameters and provide feedback from training the neural networks in the model in order to create the current revised set of rules representing the knowledge representations and reasoning utilized in the machine learning model.

A quantifier support module may support modification to vectors associated with different constants making up a part of the set of rules based on iterations of training on the data used for training the machine learning models.

A learning algorithm module contains a number of different learning algorithms that can be applied for the training of the assembled machine learning model. The learning algorithm module of the artificial intelligence engine 100 may be configured to target variables for each predicate and function in each of the rules. The learning algorithm module uses one or more cost functions to minimize errors and to supply these cost functions for the machine learning model assembled by the theory representation module. These cost functions can be used to provide a confidence score indicating how well the current interpretation satisfies the rules and data. The semantic vectors are learned by maximizing agreement with both sources i) the knowledge representations and reasoning in the set of rules and any conclusions made from iterative training on the data used for training the machine learning models.

The created machine learning model generated from a theory representation module is being trained with both i) the assertions of the representations and reasoning provided from the expert knowledge through a theory module and ii) machine learning assertions derived from iterative training on data. The expert knowledge provides a framework for data organization for the set of rules and the data refers to instructions to explain patterns. The artificial intelligence engine 100 uses both the set of rules derived from the knowledge representations and reasoning and then adaptions to the understanding of those rules derived from training data to allow for fewer training cycles and consumption of computing time than merely learning using the training data by itself.

For the machine learning model, existing simulators or other data sources can provide training data.

A query support module that is configured to present how determinations are made by the neural network in the machine learning model to give explainability to query results. The query support module that is configured to support various human interactions selected from a group consisting of Boolean queries, natural language search queries, explanation requests, axiom revisions, and any combination of these, through the query support module, and then present how determinations are made by the neural network in the machine learning model in order to give explainability to query results. The explainabilty of the results is such that when a scientist then queries on properties expressed in the knowledge representations and reasoning through the query support module, then the query support module is configured to generate query results with an ability to drill down on the results to determine why the results are this way, giving an explainability to the training, which can be correlated back to the constants, symbols, functions, and predicates supplied by the knowledge representations and reasoning in a theory module. In other embodiments, it does not have to be a drill down and instead, explanations are provided in response to questions. The explainability can be that when a user queries on properties expressed in the knowledge representations and reasoning through the query support module, then the query support module is configured to generate query results with a confidence score and at least one of 1) mapping of the properties to the constants, symbols, functions, and predicates supplied in the representations and reasoning from one or more sources in that field, and 2) providing the logic steps associated with the mapping.

Thus, the expert supplies their knowledge base including the terms, formulas, etc. of how things work. Note, a side benefit of this design is that if user has a new question, that uses terms or formulas not in the initial set of supplied terms used to create the rules, the user may reuse much of the earlier work, i.e. they don't have to train or adapt, they just reassemble a new network of machine learning modules and evaluate it.

Next, the AI model uses the constraints of the rule set out by the expert's knowledge base to then train on that set of rules and then adjust the understanding of each constant/entity, function and predicate in a set of rules, based on the data being analyzed, and learning. Through iterative uses and trainings on data using those constants, functions and predicates, and then the AI engine 100 can also see how semantically related various terms are related to each other. This occurs through iterative uses and trainings on those different terms.

The AI engine will accelerate data-driven discovery of scientific knowledge via its machine learning and reasoning system. This deep adaptive semantic logic network integrates both a "bottom-up" data-driven modeling with "top-down" theoretical reasoning (See FIG. 11). This approach integrates both the qualitative and quantitative reasoning that are essential for modeling a dynamical system, such as the biological cell, an endeavor that is far too complex for purely quantitative treatment in terms of the underlying physics. Such dynamical systems must be modeled in terms of transitions between stable regions of operation in response to controllable engineering variables. The discrete terms of art introduced to label the qualitative and quantitative elements.

Scientists are comfortable using such semi-formal technical language among themselves to formulate hypotheses and describe ideas for new experiments. To maximize their productivity, scientists should be supported by an automated logical reasoning system that can communicate in such terms, but current knowledge representation and reasoning methods require specifying ontologies and declarative knowledge in such exacting and exhaustive detail that such communication is rarely a viable option. Further, automation should back the machine reasoning about higher-level theoretical knowledge with the statistical machine learning tools that are essential for processing data at the scale required to understand the highly complex dynamical systems now studied in biology, neuroscience, and other fields that have developed high-throughput data-collection technologies.

The deep adaptive semantic logic network will provide just such a system, greatly accelerating the pace of scientific progress. An innovation of this system is making semi-formal scientific language comprehensible to computational algorithms by using machine learning to discover distributed (vector) representations of meaning that fit the usage of the terminology, in practice seamlessly baking machine learning into machine reasoning. This way, distinctions that matter for science and engineering are discovered and maintained, while conversely, irrelevant details are ignored, leaving the formalism less burdened, and the reasoning undistracted. In addition, the system adapts to different understandings of the meaning associated with a term to make the understandings less brittle/dependent on how the statements are initially set out.

Note, an architect has the option to implement these modules either with bespoke, special-purpose models that have zero or more adjustable parameters or with generic machine learning models such as neural networks. The parameters can be learned from any available combination of prior knowledge and/or data. Both are presented via the logic layer using as much logical depth as needed for their expression. The data typically needs little or none, in which case the formalism reduces to handling it in the usual way for machine learning, while the knowledge is expressed more elaborately. The learning adjusts not only the functional modules but also the distributed vector semantic representations of the entities on which they operate, thereby capturing the meaning implicit in the data and the prior knowledge.

The AI engine 100 uses logically configured learning. The system incorporates model-theoretic knowledge representation into machine learning that enables rapidly configuring and reconfiguring of complex scientific theories, experimental protocols, and data into correspondingly elaborate machine learning architectures. Scientific knowledge and hypotheses are framed as logical assertions, with the predicates and functions of the logic represented by a variety of machine learning modules and, when available, static or tunable specialized domain models. These are automatically assembled into complex machine learning models that implement the logical formulas and are then trained to maximize compatibility with the given experimental data and stated theoretical knowledge.

The AI engine 100 uses learned logical semantics. The system uses a way to exploit vector-space semantic methods to learn the intended meanings of the elementary entities over which reasoning takes place. This semantic adaptation takes place in addition to, and in coordination with, the learning of functions and predicates. Semantic distinctions can be represented merely to the extent that they make a material difference to the science as it is logically described. This liberates the reasoning processes from pedantically treating all details as equally important, resulting in far more logical robustness than is currently possible in machine reasoning systems.

Figure 2:
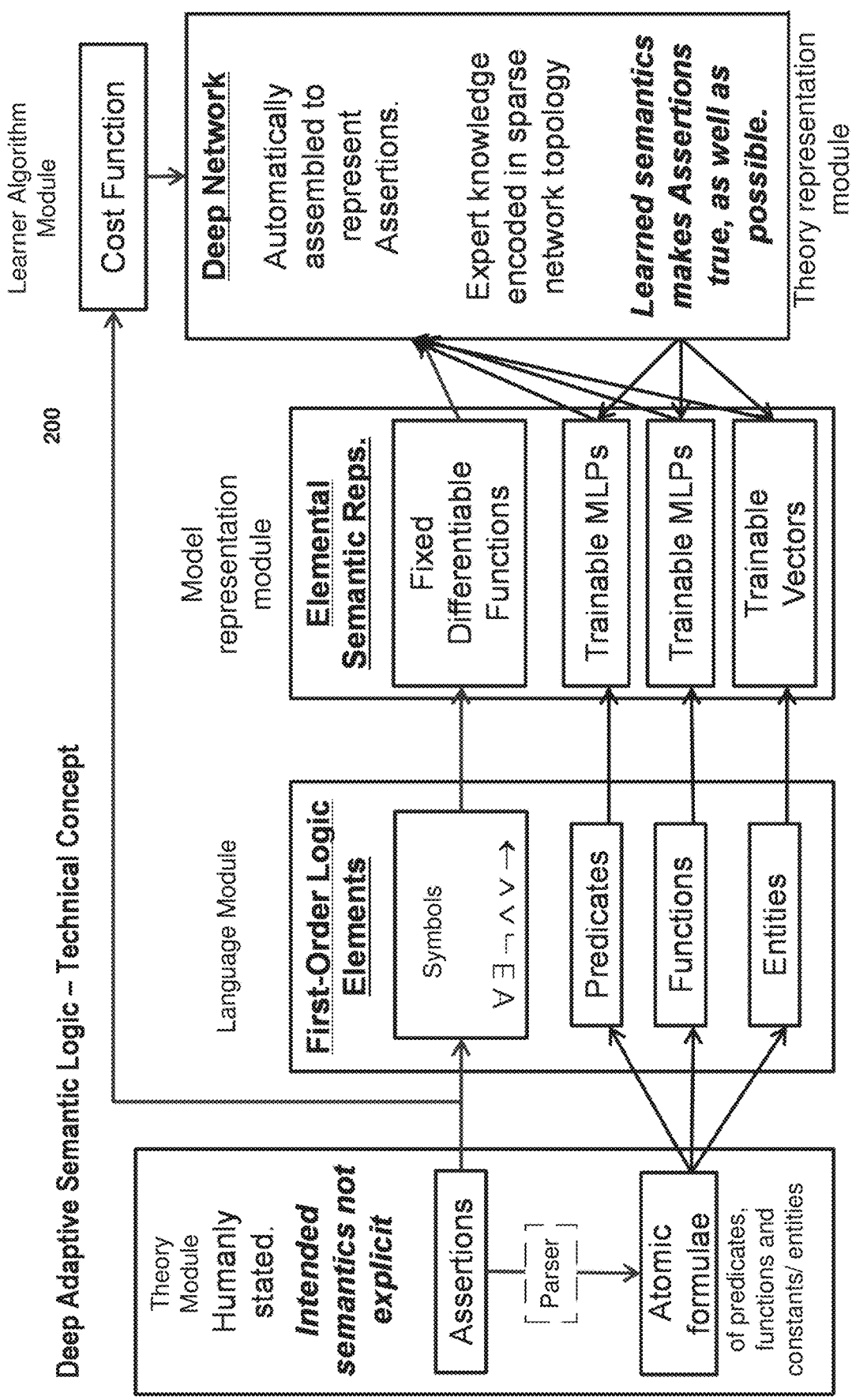
FIG. 2 illustrates a block diagram of an embodiment of an artificial intelligence engine containing modules that cooperate with each other to create machine learning models that use a deep adaptive semantic learning neural network for knowledge representations and reasoning.

FIG. 2 illustrates a block diagram of an embodiment of an artificial intelligence engine containing modules that cooperate with each other to create machine learning models that use a deep adaptive semantic learning neural network for knowledge representations and reasoning.

The theory module allows input of the humanly stated knowledge representations and reasoning, from one or more sources including an expert knowledge database and/or direct user input of discrete terms of art. The representations and reasoning are introduced to label qualitative and quantitative elements of structures to provide a vocabulary that enables scientists to describe and understand the system. The theory module is configured to encode and send assertions and atomic formulae of predicates, functions and constants/entities to a language module via a parser module. The language module uses first order logic elements to make semi-formal scientific language comprehensible to computational algorithms by cooperating with the other modules to use machine learning to discover distributed vector representations of a meaning associated with the terminology. The first order logic elements used by the language module may include logical constants, predicates, functions, and entities such that rules are expressible in first order logic, for example, in any of these three: i) ontologies or knowledge bases; ii) OWL, KIF, SWRL, and iii) structured knowledge that can be formalized (e.g. flowcharts).

The language module is also configured to contain an inventory of all of the symbols, constants, functions, and predicates derived from the statements of the expert and parsed out by the parser module.

The model representation module is configured to take in all of the symbols in the statements and associate each of them with their own sub graph of a neural network. The model representation module is also configured to take in all of the constants in the statements and map them to semantic vector as inputs to the sub graph of the neural network (Graphically, see FIGS. 4 and 5). The model representation module is also configured to take in all of the predicates in the supplied statements and map them to a sub graph of the neural networks. (Graphically, see FIGS. 4 and 5) The model representation module is also configured to take in all of the functions in the supplied statements and map them to a sub graph of the neural networks. The model representation module also is configured to annotate each neural network and its learned vectors.

The model representation module may employ semantic vectors, neural networks, and custom structures such that the deep adaptive semantic learning neural network may be automatically assembled into the first machine learning model to represent the representations and reasoning that are encoded into its neural networked topology.

The language module may send the constants in the set of rules to the model representation module to assign the trainable sematic vectors to each of the constants. The language module is also configured to send the symbols in the set of rules to the model representation module to apply fixed differential functions. The language module is also configured to send predicates and functions to the model representation module to employ trainable multilayer perceptron (MLP) neural networks.

The model representation module may also flush out any parameters that go into the neural networks based on referencing a specifications module.

In an embodiment, the Tarski model is used to map symbols, constants, functions, and predicates. The Tarski model has some logic to map each symbol and constant for its neural net.

The theory representation module then is configured to take in all of the neural networks and send them to a theory representation module to construct all of them in the machine learning model.

The assembled machine learning model from the theory representation module may exploit vector-space semantic methods to learn the intended meanings of the constants/entities over which reasoning takes place. This semantic adaptation takes place in addition to, and in coordination with, the learning of functions and predicates. The theory representation module automatically assembles a machine learning model that includes networks of graphs representing the Assertions made by the experts in the theory module. The expert knowledge is encoded in the sparse network topology.

The artificial intelligence engine 200 ensures that the system functions sensibly despite the inaccuracies that are bound to arise from mapping disparate knowledge sources into the consensus ontology, as well as from mapping user input into this ontology.

The artificial intelligence engine 200 provides artificial intelligence which will allow reasoning from expert knowledge and learning from data to take place together, minimizing the input requirements on both the knowledge and the data and making the reasoning more robust than what is available today.

The artificial intelligence engine 200 learns the expert's intended meaning of their knowledge representations and reasoning from their rough meaning and then refines their meaning from iterative training on the relevant data. This combination of knowledge-driven and data-driven machine reasoning will enable the application of artificial intelligence to increase the speed of basic and applied discovery by orders of magnitude.

FIG. 3 illustrates a diagram of an embodiment of example set of rules and predicates to be encoded by a theory module and parsed by a parser module.

The theory module allows the user to set the rules 302 and dictate the constants, predicates/properties, corresponding to the knowledge representations and reasoning in a semi-formal language understandable by a computing device.

The theory module and language module cooperate to allow the user/expert to author a set of statements in the formal language in first order logic (called the set of rules 302). The set of rules 302 is a set of statements encoded in the semi-formal programming language. For example, see the rules 302 illustrated in the figure. An example initial set of rules 302:

($\forall$x,y) (friends(x,y)$\rightarrow$friends(y,x))
($\forall$x,y)((smokes(x)$\land$friends(x,y))$\rightarrow$smokes(y))
($\forall$x)(smokes(x)$\rightarrow$hasCancer(x))

When the x and y vectors change in the rules, then the interpretation of those rules change.

In addition, each constant, such as Bob, Peter, Huey, or Loui, from the statements can have predicates 304 and/or functions such as has cancer, smokes, are friends, etc. from the statements. The example predicates 304 include has cancer, does smoke, are friends, etc.

FIG. 4 illustrates a block diagram of an embodiment of module, such as a Tarski model, model representation module and/or the language module, configured to take in all of the constants in the statements and map them to semantic vector as inputs to the sub graph of the neural network, where the module is also configured to take in all of the predicates in the supplied statements and map them to a sub graph of the neural networks, and then construct a full network from the parse tree of that statement.

As discussed, a parser module of the artificial intelligence engine 400 may go through the encoded representations and reasoning in a set of statements and parse parts of a statement into categories of constants, symbols, predicates, and/or functions in that statement. (See also FIGS. 3, 5, and 8). The parser module may be configured to know from the syntax what category these different parts of the statement go into. The parse trees of logical formulas representing asserted knowledge generate the basic structure of a deep neural network in which the constants of the domain of discourse are represented by real vectors.

Next, the module, such as a Tarski model, model representation module and/or the language module, of the artificial intelligence engine may be configured to map each constant (e.g. entity/object/person/name) to a parameterized vector. Each constant, such as Bob, Peter, Huey and Loui, are mapped as inputs to a sub graph of nodes. The module of the artificial intelligence engine is also configured to map each predicate or function, such as smokes, has cancer, or are friends, to a parameterized neural network. Each predicate/function from the knowledge inputted as a statement from the theory input module has its own sub graph of nodes/parameterized neural network. (See also FIG. 5)

Another module, such as a model representation module and/or a directed acrylic graph module, of the artificial intelligence engine 400 may be configured to construct a full neural network from a formula parse tree. As discussed, the parser module and language module may cooperate to create parse trees of logical formulas representing asserted knowledge in order to define a structure of a deep neural network in which the constants of the statements are associated later with vectors. The model representation module may adapt vector values as well as parameters of the neural network with a goal to make assertions of the representations and reasoning true as well as to be consistent with the data used for training the machine learning model.

Using the parse trees for all the statements in the set of rules, the AI engine will automatically construct a corresponding machine learning model that implements the full semantics of the scientific theory. In this example, of a proof-theoretic generation of a deep neural network using adaptive semantic learning (DASL), the modeling build process:

1. Maps each person to a parameterized vector;
2. Maps each predicate/function to a parameterized network;
3. Constructs the full network from formula parse trees;
4. Targets variables for each data column of predicates and functions for the constants for each rule (see the columns in FIG. 3);
5. Learns parameters (train network); and
6. Vector values of constants as well as parameters of the network are adapted to make assertions in the set of rules to be true and to be consistent with data being used to train the machine learning model.

FIGS. 5 and 6 illustrate diagrams of an embodiment of a parser module configured to parse each statement to produce a parse stream into categories of constants, symbols, predicates and/or functions in that statement, where the parser module is also configured to cooperate with a directed acrylic graph of nodes module to go through each statement to turn each statement into its own tree structure of nodes and then layers of nodes for each predicate and/or function in that statement.

Each constant 500, such as Bob, Peter, Huey, or Loui, from the statements can have predicates and/or functions such as has cancer, smokes, are friends, etc. from the statements. The parser module creates parse trees of different Predicates/functions parsed out from the knowledge supplied by an expert. The modules of the engine can map each predicate/function to a parameterized network such as smokes has cancer or are friends. The modules of the engine can make inputs of constants such as Bob, Peter, etc. into the graphs. Also, each constant can have its own set of graphs of nodes.

FIG. 6 shows an example of a full set of networks 600 of smokes (S), friends (F) and has cancer (C) for the parse stream.

FIG. 7 illustrates a block diagram of an embodiment of one or more modules that are configured to adapt a set of encoded rules by i) allowing for semantically similar terms of art found in the data used for training the machine learning models to be logically associated by the modules, ii) allowing for a list of semantically similar terms supplied by a user to be logically associated by the modules of the artificial intelligence engine, and iii) any combination of these two to be used by the modules to logically associate semantically similar terms of art. The modules are also configured to modify the initial set of encoded rules by modifying vectors associated with different constants of the initial set of rules using statistically-driven conclusions derived from training data.

A set of terms found in the initial set of statements and/or found in the training data may be semantically similar terms. For example, 'woman', 'queen', and 'ter royal highness' may all be semantically similar terms in the particular data being trained on and/or initial set of statements. Based on a number of factors, certain terms will have more similar vectors and thus relationship. In the example shown, cat and dog have more similar vectors 700 as compared to computer and dog. In this example, the similar terms, cat and dog, have vectors 700 that are near each other. Semantic herein refers to interpretations of the rules.

In an embodiment, each instance of a term found in the statements or in the training data is assigned its own vectors which are then mathematically summed or averaged to determine an overall vector for that term. In addition, semantically similar terms can be weighted/factored into the overall vector for a particular term.

Entities that behave in similar ways acquire similar vectors, and logical reasoning is carried out in terms of these vectors, so that logical unification occurs between entities that have similar meanings (behaviors), whether they have the same names. This approach enables the system to work without imposing extreme discipline on how assertions are stated.

The system may compare the vector metrics for the entities and see how close the vector metrics are for different representations.

The AI engine achieves robustness against ontological rigidity by assigning learned semantic vector representations to entities such as persons, institutions, job titles, etc. The semantic vectors are learned by maximizing agreement with the logical assertions and the data, as are all the model parameters, in contrast to standard methods based on co-occurrence statistics in text corpora, though the standard methods can be used for initialization when appropriate data is available, such as may be provided by the knowledge base.

The AI engine looks at terms of art and how they relate to each other. The model representation module may adjust the adjustable parameters for the constants that have vectors assigned to them that are learned. Vector Semantics for term are assigned by the AI engine to assist learning by associating similar words with similar vectors. The AI engine can plot terms and derived meanings from statistics and usage contexts. The AI engine looks at shared properties as a factor to determine semantically similar vectors, which allows for shallow reasoning; and thus, fewer computations. The AI engine can also learn vector semantics for symbols in formal reasoning systems. The AI engine can achieve more robust inference capabilities than are afforded only by the rules of the formal system.

The AI engine will learn vector semantics for symbols in formal reasoning systems. The AI engine will achieve more robust inference capabilities than are afforded only by the rules of the formal system.

FIG. 8 illustrates a block diagram of an embodiment of the language module configured to contain an inventory of all of the symbols, constants, functions, and predicates derived from a first statement by the expert and parsed out by the parser module.

Knowledge can be asserted in logical format, such as "(forall x)[B(x) implies F(x)]" and as shown "isAbove(a, b)" and "a=b: isRed(a)"

The structure of these formulas is converted directly into a network with learnable parameters. The AI engine 750 designs the sub-networks allowing user input and/or selects the graphs structure from a family of default network structures. The parameters can then be estimated using deep neural network techniques. The target for training is to make all logical assertions and all available data evaluate to "True".

Thus, a Knowledge Representation can be inputted into the theory module: "Talk about the World." The language in a statement may include the constants "a" and "b" that correspond to possible objects in the world. The language in a statement may further include function symbols such as g(•, •), f(•). The language in a statement may further include the predicate symbols isAbove(•, •), isRed(•), which indicate relations between objects. The language in a statement may further include atomic formulas: "isAbove(a, b)" and "a=b: isRed(a)." The atomic formulas can be constructed by applying logical connectives.

Network

FIG. 9 illustrates a diagram of a number of electronic systems and devices communicating with each other in a network environment in accordance with an embodiment of the artificial intelligence engine. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. Thus, any combination of server computing systems and client computing systems may connect to each other via the communications network 820.

The communications network 820 can connect one or more server computing systems selected from at least a first server computing system 804A and a second server computing system 804B to each other and to at least one or more client computing systems as well. The server computing system 804A can be, for example, the one or more server systems 220. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., laptop computer), a third mobile computing device or second portable computer 802F (e.g., tablet with an Android- or iOS-based operating system), a smart device or system incorporated into a first smart automobile 802D, a smart device or system incorporated into a first smart bicycle 802G, a first smart television 802H, a first virtual reality or augmented reality headset 804C, and the like. The client computing system 802B can be, for example, one of the one or more client systems 210, and any one or more of the other client computing systems (e.g., 802A, 802C, 802D, 802E, 802F, 802G, 802H, and/or 804C) can include, for example, the software application or the hardware-based system in which the trained AI model can be deployed. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820. Server 804B may send, for example, simulator data to server 804A.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component or direct application component, a content management component, and a database management component. The server engine can perform basic processing and operating-system level tasks. The web page management component can handle creation and display or routing of web pages or screens associated with receiving and providing digital content and digital advertisements, through a browser. Likewise, the direct application component may work with a client app resident on a user's device. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In an embodiment, a server computing system can be configured to display information in a window, a web page, or the like. An application including any program modules, applications, services, processes, and other similar software executable when executed on, for example, the server computing system 804A, can cause the server computing system 804A to display windows and user interface screens in a portion of a display screen space.

Each application has a code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow entry of details.

Computing Systems

FIG. 10 illustrates a diagram of an embodiment of one or more computing devices 900 that can be a part of the systems associated with the artificial intelligence engine and its associated models discussed herein. The computing device may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, Python, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in portion of a memory and is executed by one or more processors.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
   an artificial intelligence engine containing two or more modules that are configured to cooperate with each other to create one or more machine learning models that use an adaptive semantic learning for knowledge representations and reasoning,
   where the two or more modules of the artificial intelligence engine cooperate to cause encoding the representations and reasoning from one or more sources in a particular field with terminology used by one or more human sources in that field into a set of rules that act as constraints and that are graphed into a network understandable by a first machine learning model,
   wherein the modules are configured to interpret the set of encoded rules, wherein the interpretation of the encoded rules can change by training the network to adapt vectors associated with different constants of the set of rules and parameters of the network associated with different functions and predicates to get a more optimum interpretation that makes the rules as true as possible,
   where the interpretation can be queried via a query support module, and where the modules utilize one or more processors to execute any instructions coded in software and are stored in one or more memories of the artificial intelligence engine.

2. The artificial intelligence engine of claim 1, where the two or more modules further include:
   a theory module that is configured to allow input of the representations and reasoning, from the one or more sources that include an expert knowledge database and/or direct user input, and
   a theory representation module that is configured to encode assertions comprising predicates, functions, and constants, derived from the representations and reasoning, in such a way, to be comprehensible to computational algorithms used by the modules in order to use machine learning.

3. The artificial intelligence engine of claim 1, the two or more modules further include:
   a theory module to allow input of the representations and reasoning from the one or more sources and a theory representation module,
   where the theory representation module is configured to assemble the networks and generate the first machine learning model, where the created first machine learning model generated from the theory representation module is being trained with both i) the set of rules derived from the representations and reasoning, provided from the one or more sources and supplied through the theory module, and ii) machine learning assertions derived from iterative training on data, and
   where the artificial intelligence engine is configured to use both i) the set of rules derived from the representations and reasoning and ii) modifications of interpretations of those rules, the modifications derived from the machine learning with the training data to allow for fewer training cycles and consumption of computing time than merely learning using the training data by itself.

4. The artificial intelligence engine of claim 3, where the query support module is further configured to support various human interactions selected from a group consisting of Boolean queries, natural language search queries, explanation requests, axiom revisions, and any combination of these, through the query support module, and then present on a display an explanation of how determinations are made by a neural network in the first machine learning model to give explainability to query results, where the explainability is such that when a user queries on properties expressed in the knowledge representations and reasoning through the query support module, then the query support module is configured to generate query results with a confidence score and at least one of 1) mapping of the properties to the constants, symbols, functions, and predicates supplied in the representations and reasoning from one or more sources in that field, and 2) providing the logic steps associated with the mapping.

5. The artificial intelligence engine of claim 1, where the two or more modules further include:
   a language module that is configured to contain an inventory of the symbols, constants, functions, and predicates derived from the representations and reasoning, where the modules are configured to also adapt the interpretation of set of encoded rules by i) allowing for semantically similar terms found in the data used for training the first machine learning model to be logically associated by the modules, ii) allowing for a list of semantically similar terms supplied from the one or more sources to be logically associated by the modules of the artificial intelligence engine, or iii) any combination of these two to be used by the modules to logically associate semantically similar terms, and
   a model representation module that is configured to take the symbols derived from the representations and reasoning and associate each of them within a network, where the model representation module is also configured to take the constants derived from the representations and reasoning and map them to semantic vectors as inputs to the network, where the model representation module is also configured to take the predicates derived from the representations and reasoning and map them to the network, where the model representation module also is configured to annotate each network and its learned vectors.

6. The artificial intelligence engine of claim 1, where the two or more modules further include:
   a parser module configured to go through the encoded representations and reasoning and parse parts of each statement into categories of constants, symbols, predicates, and/or functions in that statement;
   a first module of the artificial intelligence engine configured to map each constant to a parameterized vector, where each constant is mapped as inputs to a sub graph of nodes, where the first module of the artificial intelligence engine is also configured to map each predicate and/or function to a parameterized network, and
   a second module of the artificial intelligence engine configured to construct a full network from a parse tree, where the parser module and language module cooperate to create parse trees of logical formulas representing asserted knowledge in order to define a structure of a deep network in which the constants of the statements are associated later with vectors, where a model representation module is configured to adapt vector values associated with the constants as well as adapt parameters of the network with a goal to make assertions of the representations and reasoning true as well as to be consistent with the data used for training the first machine learning model, which is indicated by a confidence score to convey the more optimum interpretation.

7. The artificial intelligence engine of claim 6, where the two or more modules further include:
   a third module of the artificial intelligence engine configured to target variables for each predicate and function in each of the rules, where the third module is configured to use one or more cost functions to minimize errors, and to supply these cost functions for the first machine learning model from the theory representation module to guide statistically-driven conclusions derived from training data to contribute to the more optimum interpretation that makes the rules as true as possible,
   where the theory representation module of the artificial intelligence engine is configured to automatically assemble the networks of graphs representing the representations and reasoning in the set of statements into the first machine learning model, where the theory representation module is also configured to learn parameters and provide feedback from training the networks in the model in order to adapt the interpretation of the set of rules representing the knowledge representations and reasoning utilized in the first machine learning model.

8. The artificial intelligence engine of claim 1, where the two or more modules further include:
   a quantifier support module configured to support modification to vectors associated with different constants making up a part of the set of rules and/or vectors not associated with those constants based on iterations of training on the data used for training the machine learning models.

9. The artificial intelligence engine of claim 1, where the two or more modules further include:
   a model representation module that is configured to employ semantic vectors, networks, and custom structures such that the adaptive semantic learning is automatically assembled into the first machine learning model to represent the representations and reasoning that are encoded into its networked topology,
   a language module that is configured to send the constants in the set of rules to the model representation module to assign the trainable sematic vectors to each of the constants, where the interpretation of the set of encoded rules is adaptable by i) allowing for semantically similar terms found in the data used for training the first machine learning model to be logically associated by the modules, ii) allowing for a list of semantically similar terms supplied from the one or more sources to be logically associated by the modules of the artificial intelligence engine, and iii) any combination of these two to be used by the modules to logically associate semantically similar terms, and
   where the language module is also configured to send the symbols in the set of rules to the model representation module to apply differential functions, and where the language module is also configured to send predicates and functions to the model representation module to employ trainable multilayer perceptron (MLP) networks.

10. The artificial intelligence engine of claim 9, where the model representation module is further configured to adapt any parameters for functions and predicates that go into the networks based on referencing a specifications module, and where the model representation module then is configured to take in the networks and send them to the theory representation module to construct all of them into the first machine learning model.

11. A method for an artificial intelligence engine, comprising:
   cooperating two or more modules of an artificial intelligence engine with each other in order to create one or more machine learning models that use an adaptive semantic learning for knowledge representations and reasoning;
   cooperating the two or more modules of the artificial intelligence engine to cause encoding the representations and reasoning from one or more sources in a particular field with terminology used by one or more human sources in that field into a set of rules that act as constraints and that are graphed into a network understandable by a first machine learning model;
   adapting an interpretation of the set of encoded rules, wherein the interpretation of the encoded rules can change by training the network to adapt vectors associated with different constants of the set of rules and parameters of the network associated with different functions and predicates to get a more optimum interpretation that makes the rules as true as possible; and
   allowing the first machine learning model to be queried via a query support module to present how determinations are made by the network in the first machine learning model to give explainability to query results.

12. The method of claim 11, further comprising:
   allowing input of the representations and reasoning, from the one or more sources that include an expert knowledge database and/or direct user input; and
   encoding assertions comprising predicates, functions, and constants, derived from the representations and reasoning, in such a way, to be comprehensible to computational algorithms used by the modules in order to use machine learning.

13. The method of claim 11, further comprising:
   using a theory module to input the representations and reasoning from the one or more sources, using a theory representation module to assemble networks and generate the first machine learning model, where the assembled networks are derived from the representations and reasoning, where the created first machine learning model generated from the theory representation module is being trained with both i) the set of rules derived from the representations and reasoning that act as constraints and ii) modifications of interpretations of those rules derived from the machine learning with the training data.

14. The method of claim 13, further comprising:

allowing querying of various human interactions selected from a group consisting of Boolean queries, natural language search queries, explanation requests, axiom revisions, and any combination of these, of the first machine learning model, and then present on a display how determinations are made by a network in the first machine learning model to give explainability to query results, where the explainability is such that when a user queries on properties expressed in the knowledge representations and reasoning through the query support module, then the query support module is configured to generate query results with a confidence score and at least one of 1) mapping of the properties to the constants, symbols, functions, and predicates supplied in the representations and reasoning from one or more sources in that field, and 2) providing the logic steps associated with the mapping.

15. The method of claim 11, further comprising:

storing an inventory of the symbols, constants, functions, and predicates derived from the representations and reasoning, adapting the interpretation of set of encoded rules by i) allowing for semantically similar terms found in the data used for training the first machine learning model to be logically associated by the modules, ii) allowing for a list of semantically similar terms supplied from the one or more sources to be logically associated by the modules of the artificial intelligence engine, or iii) any combination of these two to be used by the modules to logically associate semantically similar terms, and taking the symbols derived from the representations and reasoning and associate each of them within a network, taking the constants derived from the representations and reasoning and map them to semantic vectors as inputs to the network, taking the predicates derived from the representations and reasoning and map them to the network, and annotating each network and its learned vectors.

16. The method of claim 11, further comprising:

going through the encoded representations and reasoning in a set of statements and parse parts of each statement into categories of constants, symbols, predicates, and/or functions in that statement;

mapping each constant to a parameterized vector, where each constant are mapped as inputs to a sub graph of nodes, where the first module of the artificial intelligence engine is also configured to map each predicate and/or function to a parameterized network;

constructing a full network from a parse tree;

creating parse trees of logical formulas representing asserted knowledge in order to define a structure of a deep network in which the constants of the statements are associated later with vectors; and adapting vector values associated with the constants as well as adapt parameters of the network with a goal to make assertions of the representations and reasoning true as well as to be consistent with the data used for training the first machine learning model, which is indicated by a confidence score to convey the more optimum interpretation.

17. The method of claim 16, further comprising:

targeting variables for each predicate and function in each of the rules, using one or more cost functions to minimize errors to guide statistically-driven conclusions derived from training data and to supply these cost functions for the first machine learning model, automatically assembling the networks of graphs representing the representations and reasoning in the set of statements into the first machine learning model; and learning parameters and provide feedback from training the networks in the model in order to adapt the interpretation of set of rules representing the knowledge representations and reasoning utilized in the first machine learning model.

18. The method of claim 11, further comprising:

supporting modification to vectors associated with different constants making up a part of the set of rules based on iterations of training on the data used for training the machine learning model to guide as well as adapting vectors not associated with those constants based on iterations of training on the data used for training the machine learning models.

19. The method of claim 18, further comprising:

also adapting the interpretation of the set of encoded rules by i) allowing for semantically similar terms found in the data used for training the machine learning models to be logically associated by the modules, ii) allowing for a list of semantically similar terms supplied by an expert to be logically associated by the modules of the artificial intelligence engine, and iii) any combination of these two to be used by the modules to logically associate semantically similar terms;

employing semantic vectors, networks, and custom structures such that the adaptive semantic learning is automatically assembled into the first machine learning model to represent the representations and reasoning that are encoded into its networked topology; and assigning the trainable sematic vectors to each of the constants in the set of rules, applying differential functions to the symbols in the set of rules, and using trainable multilayer perceptron (MLP) neural networks for the predicates and functions in the set of rules.

20. The method of claim 19, further comprising:

adapting any parameters for functions and predicates that go into the networks based on referencing a specifications module; and taking in the networks and sending them to the theory representation module to construct the networks into the first machine learning model.

* * * * *